(12) United States Patent
Massie et al.

(10) Patent No.: US 11,388,337 B1
(45) Date of Patent: Jul. 12, 2022

(54) READOUT INTEGRATED CIRCUIT CONTAINING IMAGE STABILIZATION CAPABILITIES

(71) Applicant: Raytheon Company, Waltham, MA (US)

(72) Inventors: Mark A. Massie, Solvang, CA (US); Chaffra A. Affouda, Santa Barbara, CA (US); Richard J. Peralta, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/211,090

(22) Filed: Mar. 24, 2021

(51) Int. Cl.
| | | |
|---|---|---|
| *H04N 5/232* | (2006.01) | |
| *H04N 19/43* | (2014.01) | |
| *H04N 5/378* | (2011.01) | |
| *G06T 7/20* | (2017.01) | |
| *H04N 5/357* | (2011.01) | |

(52) U.S. Cl.
CPC ........... *H04N 5/23254* (2013.01); *G06T 7/20* (2013.01); *H04N 5/23258* (2013.01); *H04N 5/357* (2013.01); *H04N 5/378* (2013.01); *H04N 19/43* (2014.11)

(58) Field of Classification Search
CPC ........... H04N 5/23254; H04N 5/23258; H04N 5/357; H04N 5/378; H04N 19/43; G06T 7/20–48
See application file for complete search history.

(56) References Cited

U.S. PATENT DOCUMENTS

| 3,859,460 A | 1/1975 | Westell | |
|---|---|---|---|
| 8,723,953 B2 | 5/2014 | Klomp et al. | |
| 9,681,052 B1 | 6/2017 | Lewkow | |
| 10,194,089 B2 | 1/2019 | Nash et al. | |
| 10,452,905 B2 | 10/2019 | Segalovitz et al. | |
| 10,715,728 B1 | 7/2020 | Ragucci | |
| 2006/0125938 A1* | 6/2006 | Ben-Ezra | G06T 5/003 348/241 |
| 2009/0324087 A1* | 12/2009 | Kletter | G06T 7/13 382/195 |
| 2010/0226495 A1 | 9/2010 | Kelly et al. | |
| 2011/0222779 A1* | 9/2011 | Karanam | G06T 7/13 382/199 |

(Continued)

OTHER PUBLICATIONS

M. A. Massie, et al., "Neuromorphic infrared focal plane performs sensor fusion on-plane local contrast enhancement spatial and temporal filtering," Wright Lab—Armament Directorate, Eglin Air Force Base, SPIE Proc., vol. 1961, pp. 188-202, 1993, 15 pages.

(Continued)

*Primary Examiner* — Lin Ye
*Assistant Examiner* — Chris S Yoder, III

(57) ABSTRACT

An apparatus includes an optical sensor configured to capture a plurality of input images. The apparatus also includes an analog circuit configured to produce a difference of Gaussians image for each of the input images. The apparatus further includes at least one processor configured to (i) determine motion error in the input images based on comparing the difference of Gaussians image and (ii) adjust at least some of the input images based on the determined motion error.

20 Claims, 10 Drawing Sheets

(56) References Cited

U.S. PATENT DOCUMENTS

2015/0116564 A1  4/2015 Williams
2020/0014848 A1  1/2020 Gove

OTHER PUBLICATIONS

J. P. Curzan, et al., "Variable Acuity Imager with Dynamically Steerable, Programmable Suerpixels," Air Force Research Laboratory, Release Authority #AAC-PA02-325, pp. 1-9, Approved Jul. 1, 2002, 9 pages.
Thomas Gerig, et al., "Spatially Varying Registration using Gaussian Processes," University of Basel, Basel, Switzerland, University of Bern, Bern, Switzerland, 8 pages.
Mark Massie, et al., "Neuromorphic infrared focal plane performs on-plane local contrast enhancement, spatial, and temporal filtering," Proc. SPIE 1762, infrared Technology XVIII, (1992); pp. 360-375, 16 pages.
Paul L. McCarley, et al., "Large format variable spatial acuity superpixel imaging: visible and infrared systems applications," Companion to SPIE paper 4820-36, 2002, 9 pages.

* cited by examiner

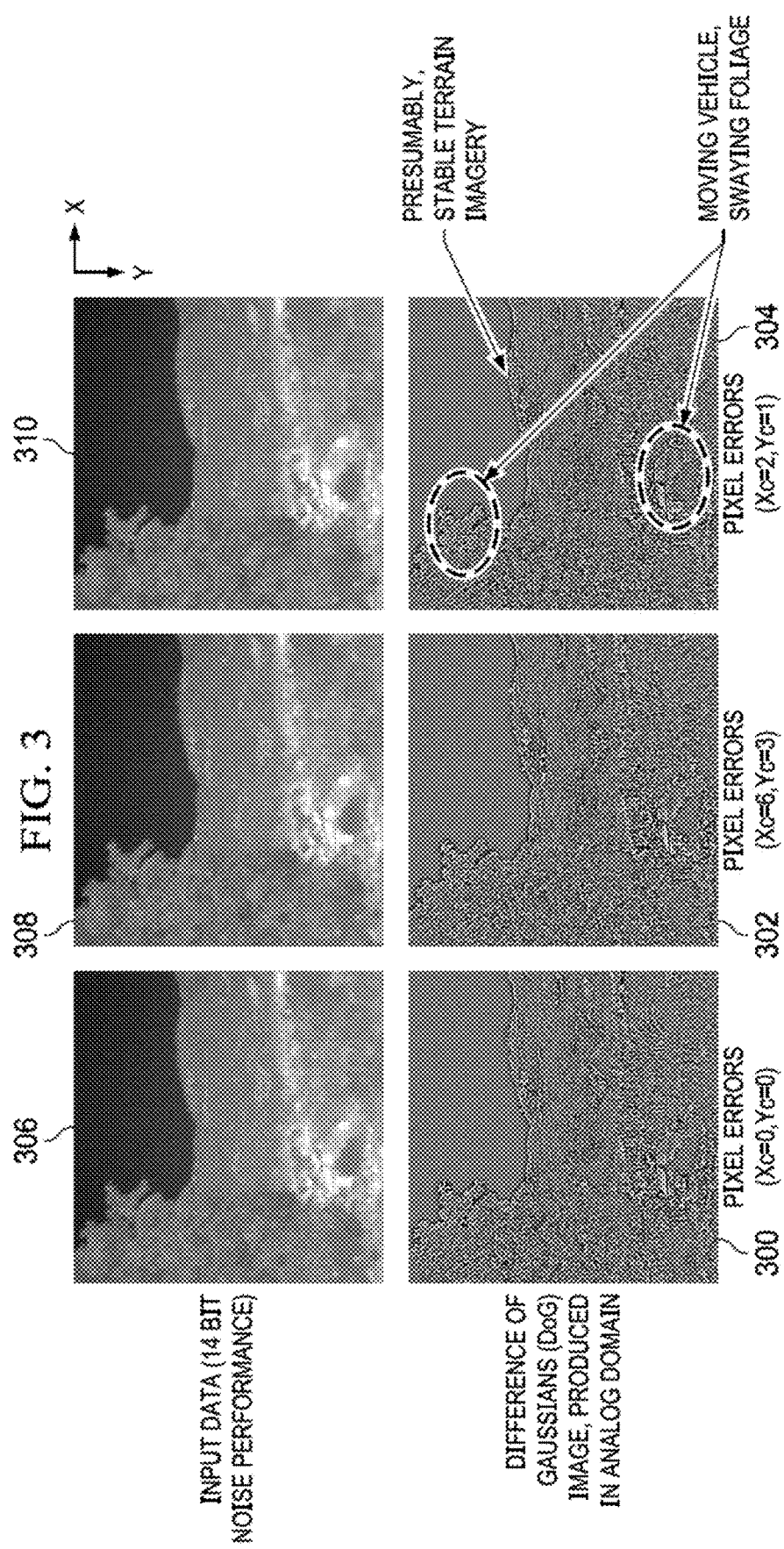

FIG. 8A
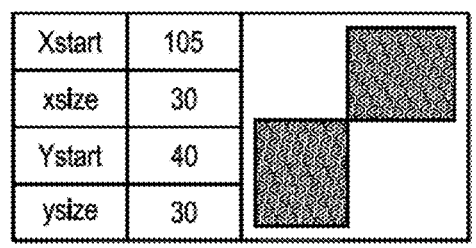
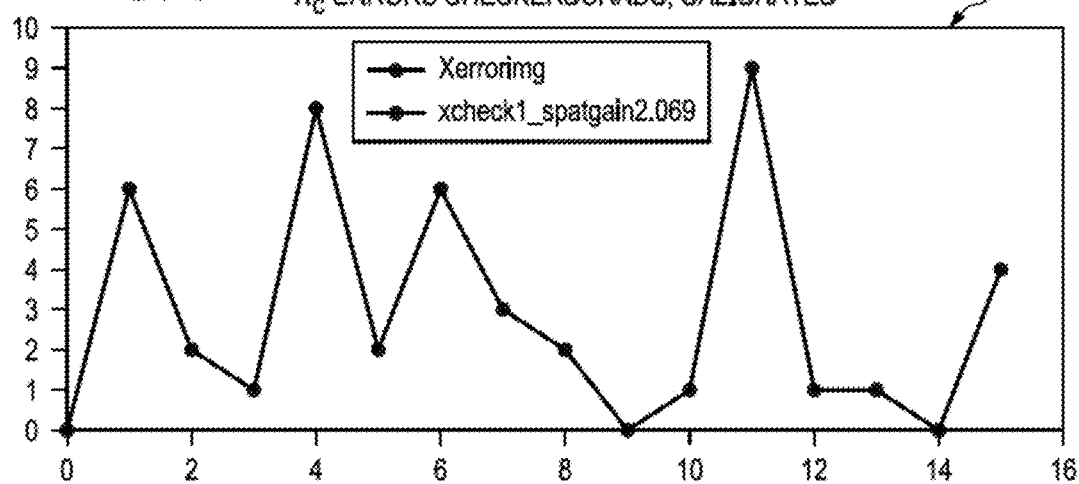
FIG. 8B $X_c$ ERRORS CHECKERBOARDS, CALIBRATED
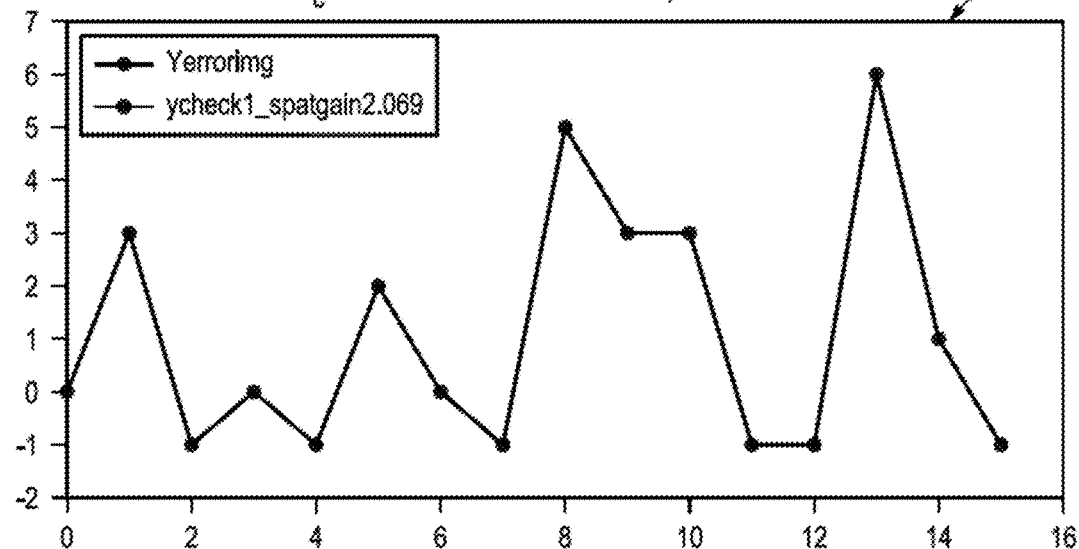
FIG. 8C $Y_c$ ERRORS CHECKERBOARDS, CALIBRATED

US 11,388,337 B1

READOUT INTEGRATED CIRCUIT CONTAINING IMAGE STABILIZATION CAPABILITIES

TECHNICAL FIELD

This disclosure relates generally to image stabilization devices and processes. More specifically, this disclosure relates to a readout integrated circuit containing image stabilization capabilities.

BACKGROUND

Various causes can produce image motion jitter, but the primary causes are typically (i) vibration caused by elements surrounding a mounting platform of a sensor and/or (ii) periodic vibration displacement into a cold finger assembly of a sensor caused by a cryocooler motor, especially for rotary-type cryocoolers. Either or both conditions can cause image motion with a distribution on the order of up to a few pixels. This type of image motion jitter can make it difficult or impossible to obtain high-resolution images or other desired images.

SUMMARY

This disclosure provides a readout integrated circuit containing image stabilization capabilities.

In a first embodiment, an apparatus includes an optical sensor configured to capture a plurality of input images. The apparatus also includes an analog circuit configured to produce a difference of Gaussians image for each of the input images. The apparatus further includes at least one processor configured to (i) determine motion error in the input images based on comparing the difference of Gaussians image and (ii) adjust at least some of the input images based on the determined motion error.

In a second embodiment, a method includes capturing, using an optical sensor, a plurality of input images. The method also includes producing, using an analog circuit, a difference of Gaussians image for each of the input images. The method further includes determining, using at least one processor, motion error in the input images based on comparing the difference of Gaussians images. In addition, the method includes adjusting, using the at least one processor, at least some of the input images based on the determined motion error.

In a third embodiment, a non-transitory computer readable medium contains instructions that when executed cause a signal processor to obtain, using an optical sensor and an analog circuit, a difference of Gaussians image for each of a plurality of input images. The medium also contains instructions that when executed cause the signal processor to determine motion error in the input images based on comparing the difference of Gaussians images. The medium further contains instructions that when executed cause the signal processor to adjust at least some of the input images based on the determined motion error.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIG. 3 illustrates an example difference of Gaussians images in accordance with this disclosure;

FIGS. 8A through 8C illustrate example measured frame-based spatial errors using a "center of signal" technique in accordance with this disclosure;

DETAILED DESCRIPTION

FIGS. 1 through 12, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, various causes can produce image motion jitter, but the primary causes are typically (i) vibration caused by elements surrounding a mounting platform of a sensor and/or (ii) periodic vibration displacement into a cold finger assembly of a sensor caused by a cryocooler motor, especially for rotary-type cryocoolers. Either or both conditions can cause image motion with a distribution on the order of up to a few pixels. This type of image motion jitter can make it difficult or impossible to obtain high-resolution images or other desired images. This disclosure provides a readout integrated circuit containing image stabilization capabilities, which can help to reduce or eliminate image motion jitter in captured images.

Figure 1:
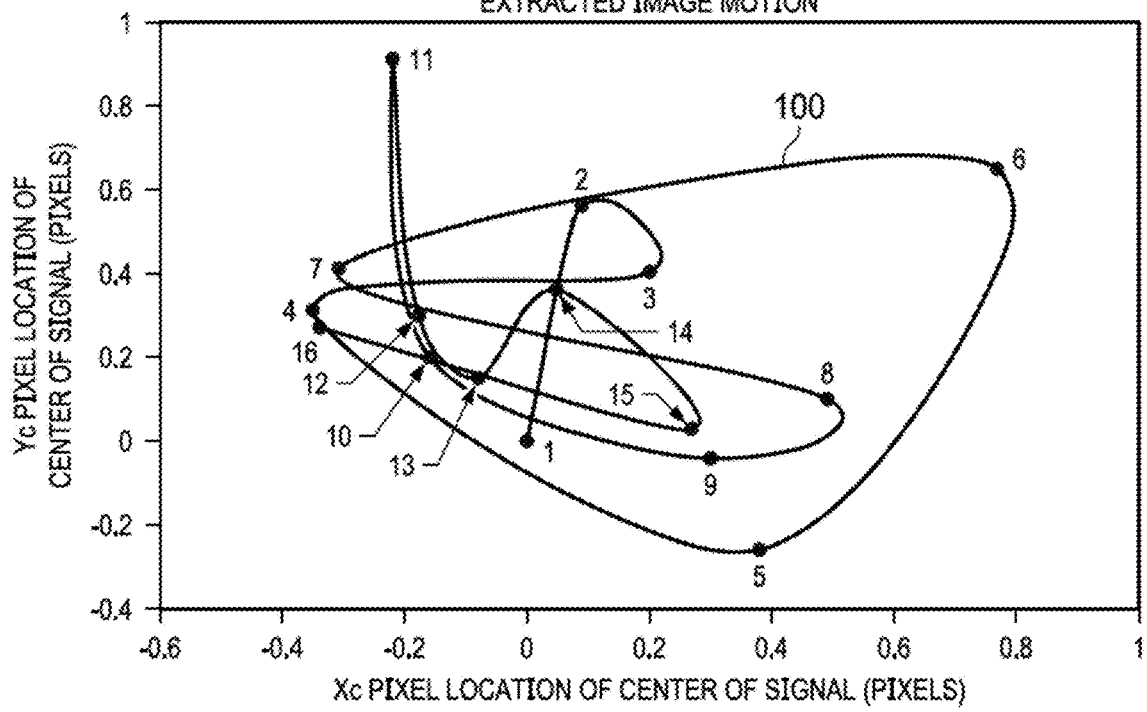
FIG. 1 illustrates example image motion.

FIG. 1 illustrates example image motion 100. As shown in FIG. 1, the image motion 100 can vary, such as due to conditions (i) and (ii) mentioned above. The image motion 100 can also have a distribution on the order of up to a few pixels. For example, in a specific device, a 1280×1024 format focal plane array with a 12 μm pixel pitch and F/2.4 optics can experience cryocooler-induced image motion on the order of 1.5 or so pixels.

This disclosure describes a readout integrated circuit that incorporates one or more functions to accomplish image motion stabilization for infrared or other applications. In general, this disclosure uses analog-domain processing of a full-sized image (instead of using digital power-consuming operations). For example, real-time spatial motion can be corrected by exploiting certain computations performed in the analog domain, thereby saving orders of magnitude of total system power as compared to more traditional field programmable gate array (FPGA) digital implementations. As particular examples, "difference of Gaussians" and "zero-crossing" operations can be reduced to simple massively-parallel analog operations, and digital computations can be used for performing small-area calculations (such as "center of signal" evaluations) and for outputting indexing operations that accomplish the intended image stabilization function. This readout integrated circuit can help to significantly reduce or eliminate the image motion 100 shown here. Note that the readout integrated circuit described below may be used to at least partially reduce any other suitable image motion that might be present in a given application.

In some embodiments, three-dimensional hybridization approaches (such as "direct bond hybridization" or "DBH") can be used to allow the desired processing to occur in subsequent layers. Without this assumption, there might not be adequate silicon within a unit cell architecture of a pixel array to accomplish the variety of processing steps performed. However, these layers do not have to dissipate much if any power because many of the operations can be implemented with switched capacitors, which consume vanishingly small amounts of electrical power.

Three-dimensional hybridization involves a wafer-to-wafer bonding of silicon wafers with electrical interconnection. Direct bond hybridization can have the wafers integrated with through-silicon vias. A typical direct bond hybridization process begins with front-end-of-line fabrication of implants and gates patterned. A sub-micron through silicon via produces one or more vertical electrical connections that pass completely through a silicon wafer. A back-end-of-line portion of the fabrication interconnects the individual devices with wiring on the wafer. The wafer is then flipped upside down and mounted on a handling wafer. A wet etch to buried oxide process is performed to remove a backside. The buried oxides is then removed to expose the through silicon vias. A surface preparation process is performed on the posts and seeds. This process allows for direct bond hybridization of multiple wafers to be bonded without any additional layers. While this method is described, any particular direct bond hybridization process can be used and any form of a semiconductor device with multiple bonded layers.

Figure 2A:
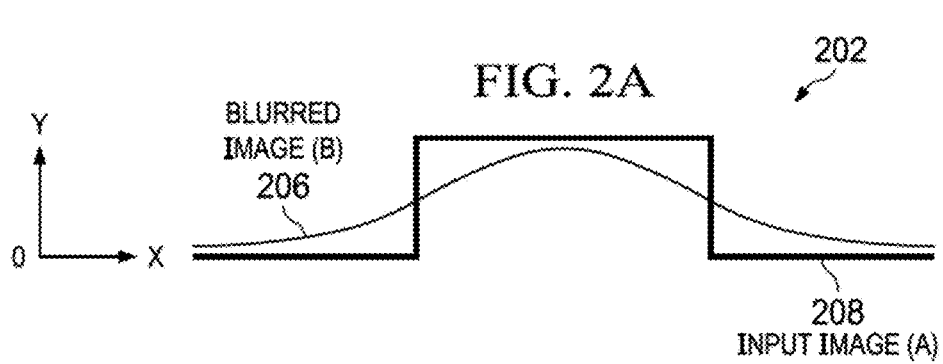
FIGS. 2A and 2B illustrate an example difference of Gaussians image processing technique in accordance with this disclosure.
Figure 4:
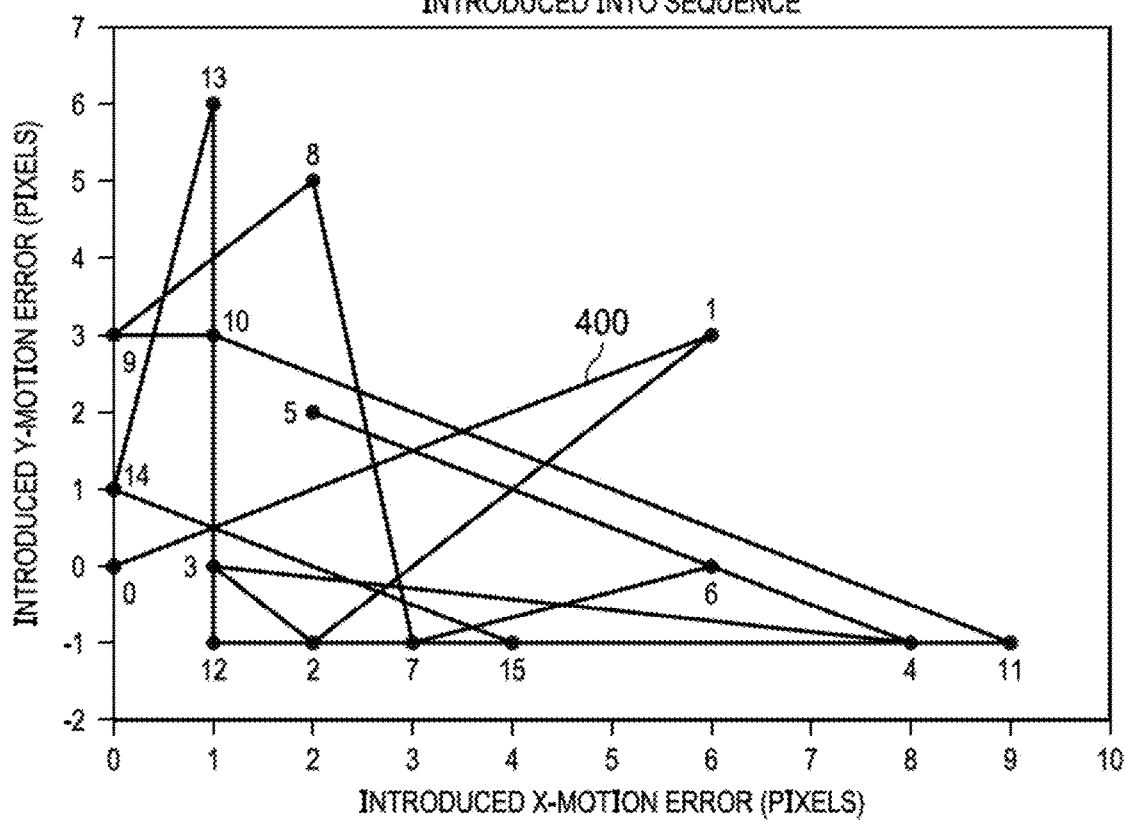
FIG. 4 illustrates an example intentionally-introduced spatial motion error for comparison with performance of motion detection techniques in accordance with this disclosure.
Figure 6:
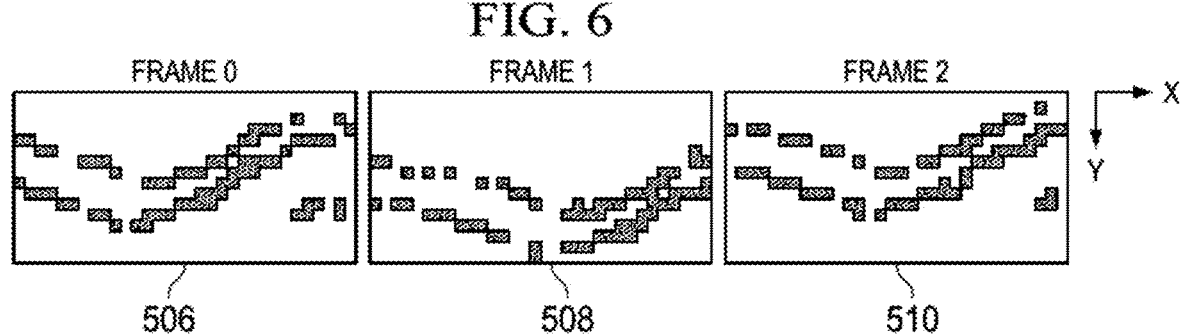
FIG. 6 illustrates example edge location comparisons in accordance with this disclosure.
Figure 5:
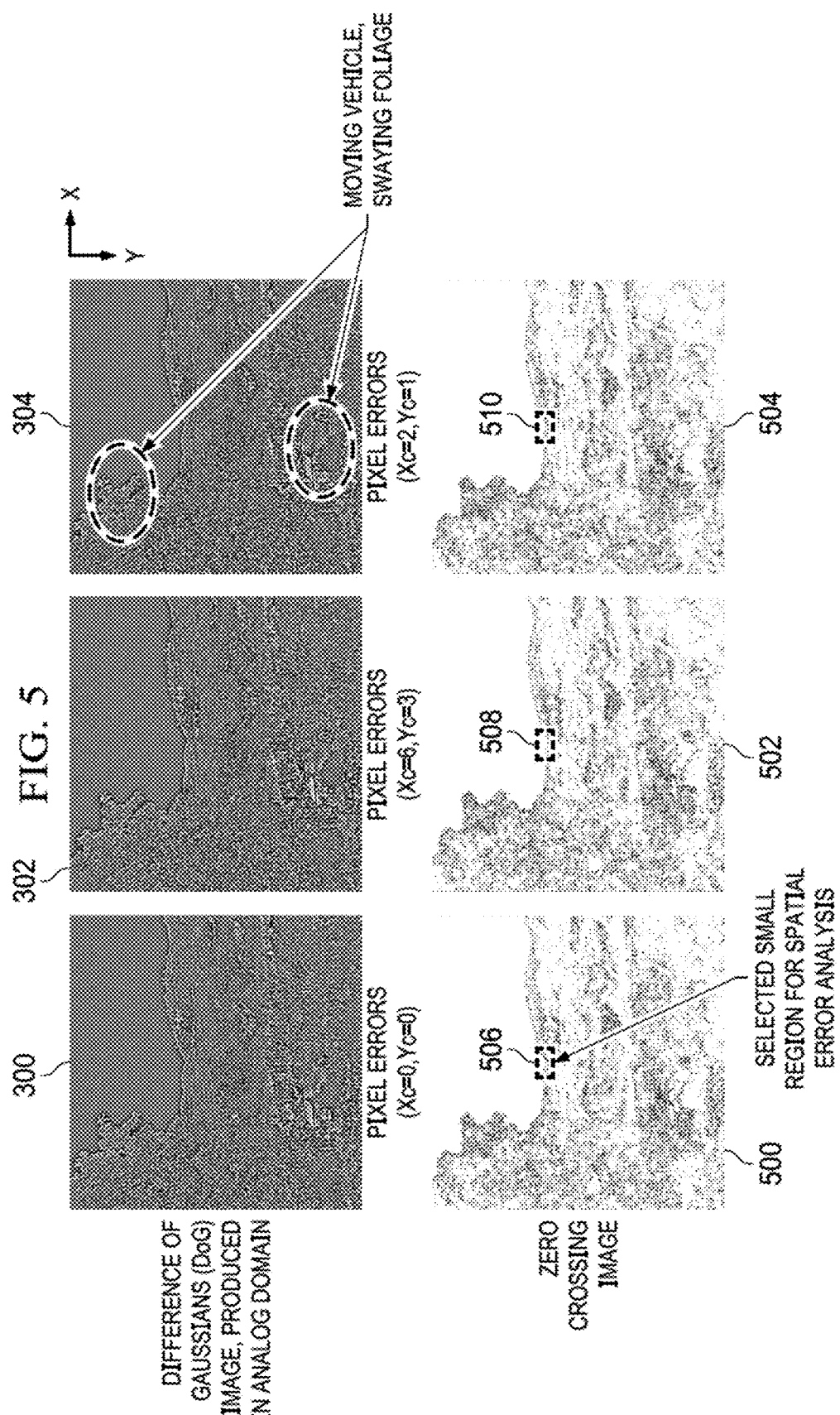
FIG. 5 illustrates example zero-crossing images produced from difference of Gaussians images in accordance with this disclosure.
Figure 9A:
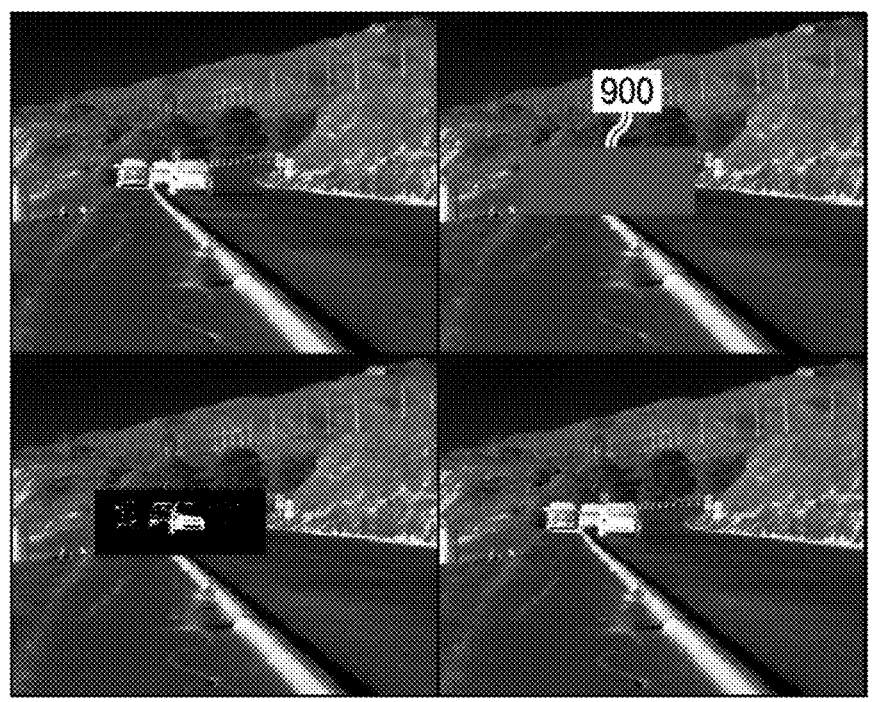
FIGS. 9A through 9C illustrate an example patch filter showing sub-pixel image stabilization at high jitter in accordance with this disclosure.
Figure 9B:
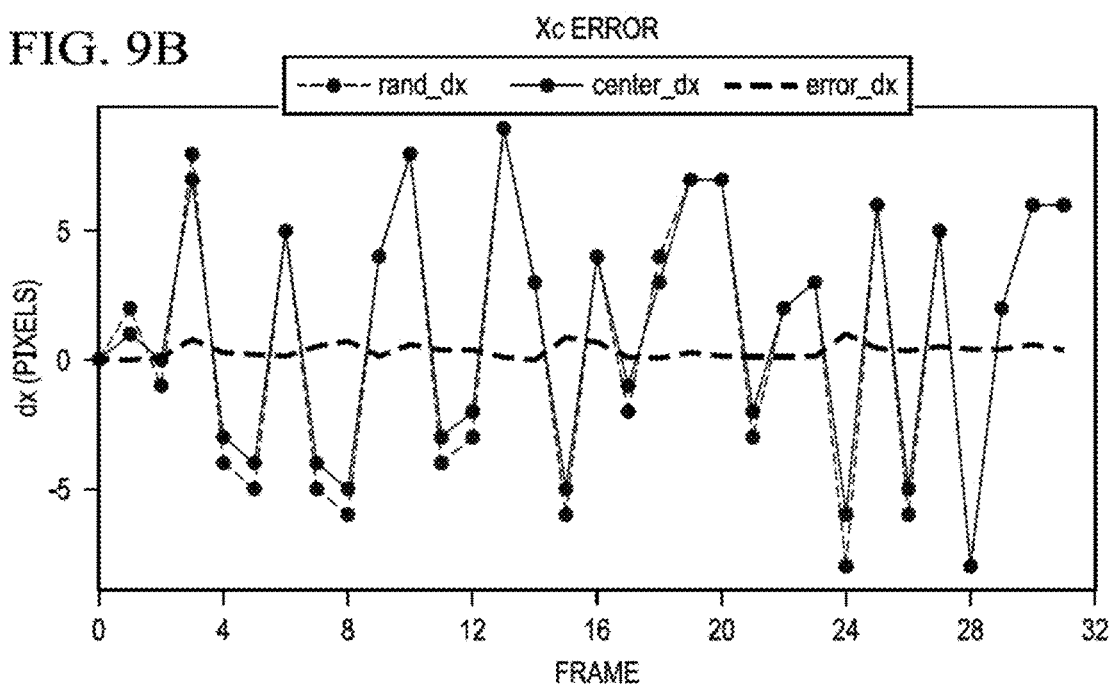
Figure 9C:
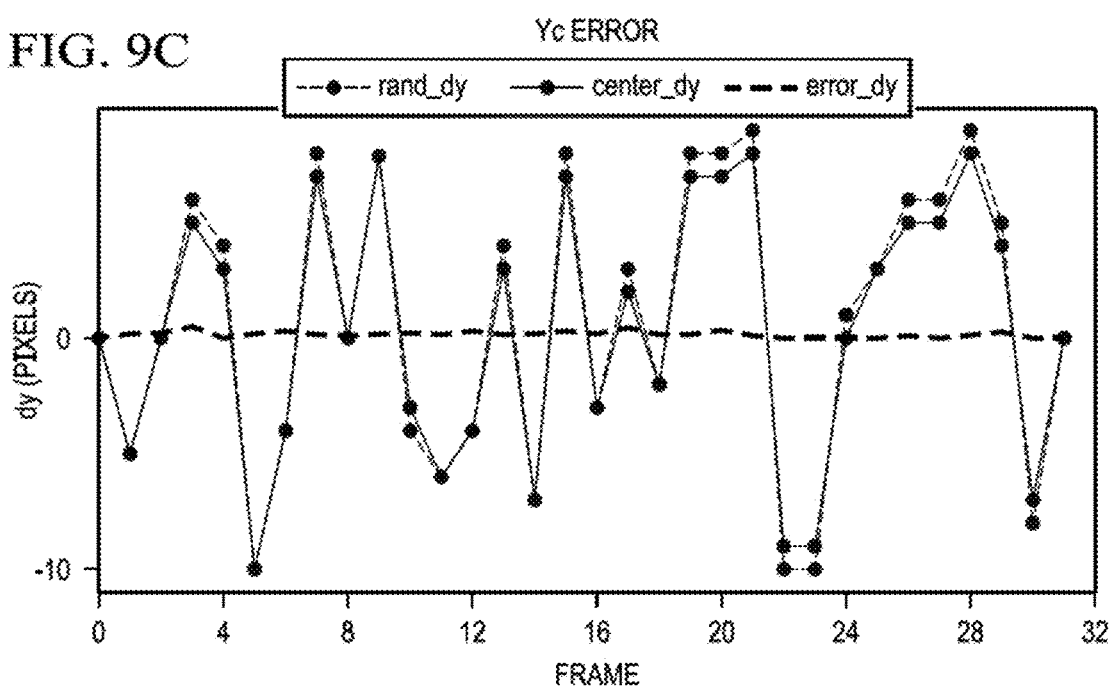
Figure 10:
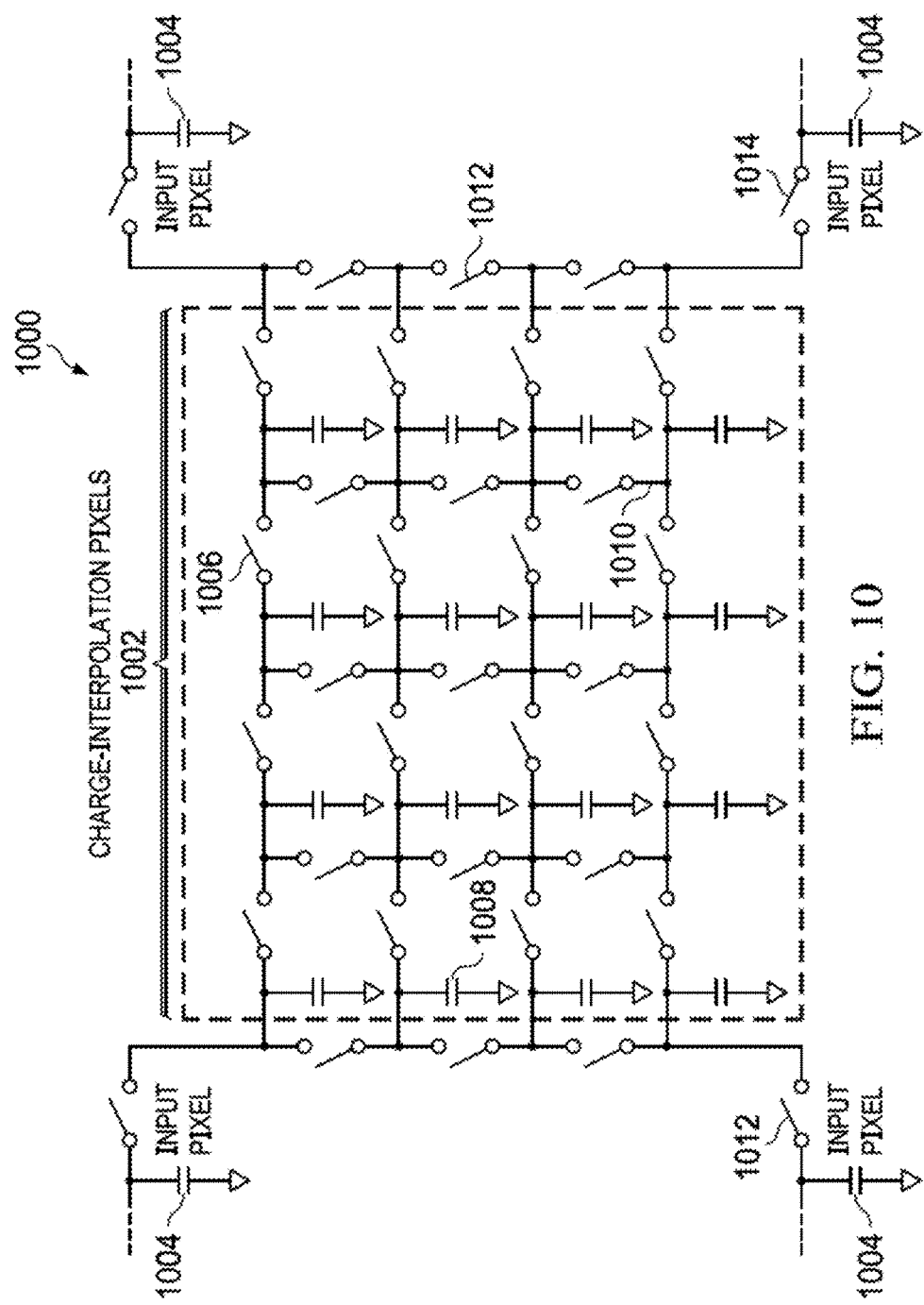
FIG. 10 illustrates an example readout integrated circuit containing image stabilization capabilities in accordance with this disclosure.

FIGS. 2A through 10 illustrate a readout integrated circuit with stabilization capacity and related details in accordance with this disclosure. In particular, FIGS. 2A and 2B illustrate an example difference of Gaussians image processing technique in accordance with this disclosure. FIG. 3 illustrates an example difference of Gaussians images in accordance with this disclosure. FIG. 4 illustrates an example intentionally-introduced spatial motion error for comparison with performance of motion detection techniques in accordance with this disclosure. FIG. 5 illustrates example zero-crossing images produced from difference of Gaussians images in accordance with this disclosure. FIG. 6 illustrates example edge location comparisons in accordance with this disclosure. FIGS. 7A through 7C illustrate an example background region produced from measured errors in accordance with this disclosure. FIGS. 8A through 8C illustrate example measured frame-based spatial errors using a "center of signal" technique in accordance with this disclosure. FIGS. 9A through 9C illustrate an example patch filter showing sub-pixel image stabilization at high jitter in accordance with this disclosure. FIG. 10 illustrates an example readout integrated circuit containing image stabilization capabilities in accordance with this disclosure;

Analog structures in the human visual system (as well as vision systems in other vertebrate animals) have highly-evolved structures for detecting image motion. These cellular structures may be approximated by analog processing operations that are incorporated into pixel unit cells of an imaging system, which make use of switched capacitor resistors integrated into two-dimensional pixel architectures of readout integrated circuits. In effect, an image is spatially blurred by a radially-distributing image photo-charge produced by any given pixel into its two-dimensional surroundings, and a differencing operation is performed to extract contrast edges within the scene.

Figure 2B:
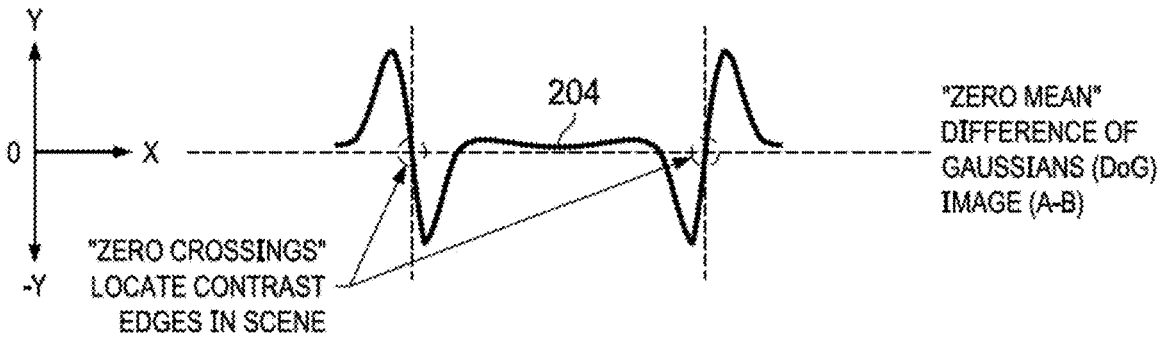

As shown in FIGS. 2A and 2B, a difference of Gaussians image processing technique 200 may be digitally performed using a "Mexican hat filter" kernel 202. When implemented in the analog domain, a difference of Gaussians image 204 is obtained by subtracting a spatially low-pass filtered or blurred image 206 from an input image 208. Notice that while the input image 208 contains numbers entirely in the positive number domain here, the difference of Gaussians image 204 has a "zero mean" distribution. As a result, the difference of Gaussians image 204 has both positive and negative values due to a subtraction process. Because the difference of Gaussians image 204 essentially subtracts direct current values within a scene, this technique 200 is highly tolerant to variations in the absolute brightness or signal level within the scene. This high tolerance allows for greater enhancement of both bright and dim scenes.

As shown in FIG. 3, three difference of Gaussians images 300, 302, 304 are produced using three input images 306, 308, 310, respectively. For example, a first input image 306 may be subtracted from a blurred image 206 to generate a first difference of Gaussians image 300. The same relation exists for producing a second difference of Gaussians image 302 using the second input image 308 and producing a third difference of Gaussians image 304 using the third image 310. In some embodiments, the first input image 306 may be a reference input image, and the first difference of Gaussians image 300 may be a reference difference of Gaussians image. However, other input images and difference of Gaussians images may be used as the references.

Here, the three input images 306, 308, 310 may be captured using mid-wave infrared imagery or other suitable image capture technique. In this example, image motion jitter exists in the frame sequence for purposes of illustrating the proposed motion stabilization technique. In this particular example, each input image 306, 308, 310 captures a scene in a hilly area with a moving vehicle. At the top of the input images 306, 308, 310 appears the sky with a substantially uniform darkness. On the left side of each input image 306, 308, 310 is foliage that can sway or otherwise move between capture of the input images 306, 308, 310. In other words, the foliage appears to move in a different manner from the rest of the input images 306, 308, 310. At the bottoms of the input images 306, 308, 310 is a car that appears to be moving at the base of the foliage. The car appears in different locations of the input images 306, 308, 310 compared to the rest of the frames to indicate that the car is in motion.

As shown in FIG. 4, specific spatial motion errors 400 captured in the input images 306, 308, 310 can be randomly chosen for both axes and scaled to be large (such as approximately ±4 pixels). The specific motion errors 400 are shown in FIG. 4 and below in Table 1. Here, the input image 306 (frame 0) is chosen as a reference frame, and the input images 308 and 310 are non-reference frames and are corrected to exhibit minimum residual spatial errors.

TABLE 1

Intentionally-introduced spatial motion errors provide truth data for comparison with performance of motion detection techniques to be described

| FRAME | X error image | Y error image |
|---|---|---|
| 0 | 0 | 0 |
| 1 | 6 | 3 |
| 2 | 2 | −1 |
| 3 | 1 | 0 |
| 4 | 8 | −1 |
| 5 | 1 | 2 |
| 6 | 6 | 0 |
| 7 | 3 | −1 |
| 8 | 2 | 5 |
| 9 | 0 | 3 |
| 10 | 1 | 3 |
| 11 | 9 | −1 |
| 12 | 1 | −1 |
| 13 | 1 | 6 |
| 14 | 0 | 1 |
| 15 | 4 | −1 |

Zero-crossings in a difference of Gaussians image indicate where contrast changes are located within an input image and provide a convenient way for finding edges. If a given pixel defines a point in a difference of Gaussians image and the given pixel has a neighboring pixel on one side (such as north) with a positive value and a neighboring pixel on an opposite side (such as south) with a negative value, the given pixel is determined to be a zero-crossing pixel or "visible" pixel. In some embodiments, the given pixel is used to inhibits these opposing neighbors by setting their respective values to a specific value (such as 255) and establishes itself as a viable zero-crossing pixel by setting itself to another specific value (such as 0). The comparison of neighboring pixels can be performed in various directions, such as along multiple axes (like north/south and east/west axes). The cumulation of the visible pixels makes up a zero-crossing image.

An example of this is shown in FIG. 5, where zero-crossing images 500, 502, 504 are respectively associated with the difference of Gaussians images 300, 302, 304. The zero-crossing images 500, 502, 504 here accurately represent the spatial content within the difference of Gaussians images 300, 302, 304 using one-bit values (either black or white). For example, a first zero-crossing image 500 is produced by determining whether each pixel in the first difference of Gaussians image 300 is a zero-crossing by comparing neighboring pixels in the first difference of Gaussians image 300. The same relation exists for a second zero-crossing image 502 based on the second difference of Gaussians image 302 and a third zero-crossing image 504 based on the third difference of Gaussians image 304. In some embodiments, the first zero-crossing image 502 can be used as a reference zero-crossing image.

The accurate representations of the spatial content within the difference of Gaussians images 300, 302, 304 by the zero-crossing images 500, 502, 504 are useful for analyzing how the spatial distribution of the content changes quantitatively in different axes as input images are produced. Note that, in other embodiments, the visibility of the pixels can be reversed in the zero-crossing images to generate "inverse" zero-crossing images, which can be processed in a similar manner as discussed below for the zero-crossing images. Thus, the inverse zero-crossing images can be processed in conjunction with or instead of the zero-crossing images during image stabilization. For simplicity, the processing of zero-crossing images for image stabilization will be described below.

Once the zero-crossing images 500, 502, 504 are obtained, a "center of signal" can be determined for each using representative image regions 506, 508, 510 of the zero-crossing images 500, 502, 504. Each representative image region 506, 508, 510 may contain horizontal and/or vertical image features. Example representative image regions 506, 508, 510 of the zero-crossing images 500, 502, 504 are identified in FIG. 5, and magnified versions of the representative image region 506, 508, 510 are shown in FIG. 6. The magnified representative image regions 506, 508, 510 show representative horizontal-like edges that are part of the hills in the background of the frames 306, 308, 310.

In some embodiments, the "center of signal" in a small region of an image may be similar to a "center of mass" calculation and can be represented as follows:

$$\text{Center of Signal } X = X_C = \frac{\sum_{1}^{N}(Sig_N * x_N)}{\sum_{1}^{N} Sig_N} \quad (1)$$

$$\text{Center of Signal } Y = Y_C = \frac{\sum_{1}^{N}(Sig_N * y_N)}{\sum_{1}^{N} Sig_N} \quad (2)$$

Here, $X_c$ represents a value in the X-domain for a center of mass, N represents a number of a pixel in a representative image region, $Sig_N$ represents a multi-bit (such as a 14-bit) value for a pixel, and $X_n$ represents an x-coordinate in the representative image region for the pixel. Also, $Y_c$ represents a value in the Y-domain for the center of mass, and $y_n$ represents a y-coordinate in the representative image region for the pixel.

Notice that each ($X_c$, $Y_c$) "center of signal" is a floating-point value that contains knowledge of the spatial registration error of any image with respect to a specified image in a sequence (such as the first input image), and the spatial registration error has sub-pixel precision. Assuming optical system distortions across the field of view are negligible, having accurate measurements of $X_c$ and $Y_c$ determined through analysis of background-related edges in a scene can be exploited to subsequently remove spatial jitter from real-time images.

Figure 7A:
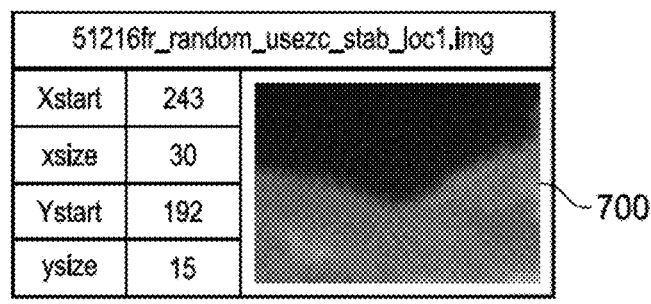
FIGS. 7A through 7C illustrate an example background region produced from measured errors in accordance with this disclosure.
Figure 7B:
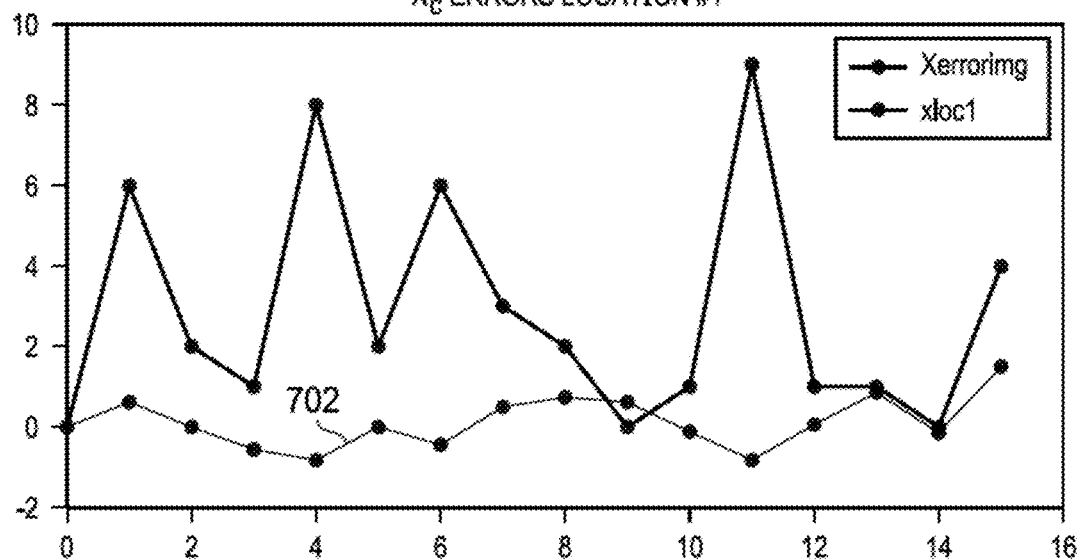
Figure 7C:
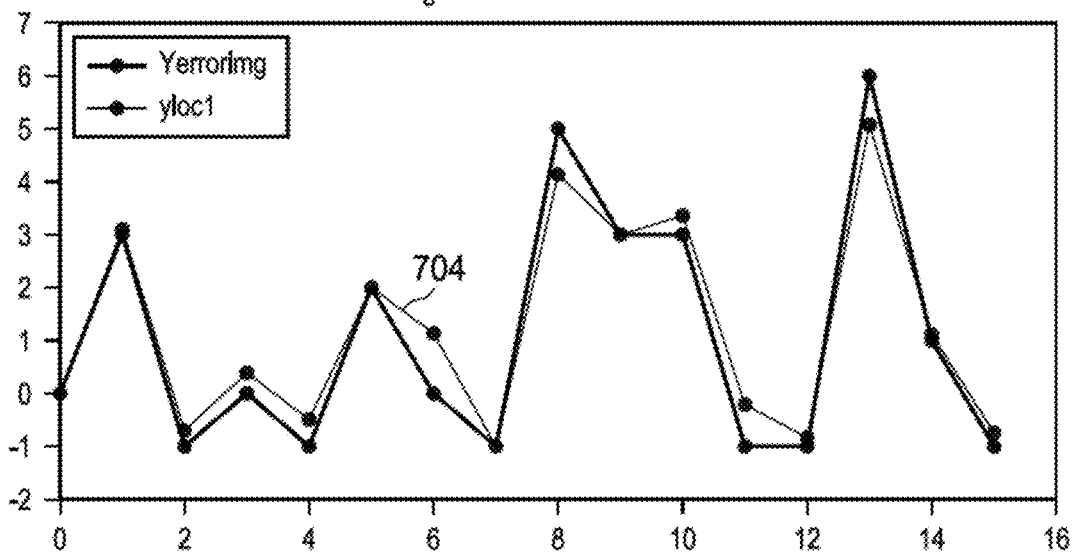

As shown in FIGS. 7A through 7C, a background region 700 can be used to produce measured $X_c$ error locations 702 and measured $Y_c$ error locations 704. Here, when center of signal calculations are made for multiple images in a sequence (sixteen images in this example), the "vertical-like" contrast feature contained in this small background region 700 (30×15 pixels in size for this example) has enough frame-to-frame variation to produce an accurate result of $Y_c$ errors locations 704. In order to achieve good accuracy for the value of the $X_c$ error locations 702, a similar edge contrast feature but in the horizontal dimension can be used. Examples of the center of signal data for this particular sequence of images is shown in Table 2 below.

TABLE 2

Data table for center of signal determination

| Frame | X error image | Y error image | Measured $X_c$ | Measured $Y_c$ | Xresid error (%) | Yresid error (%) |
|---|---|---|---|---|---|---|
| 0 | 0 | 0 | 0 | 0 | 0.00 | 0.00 |
| 1 | 6 | 3 | 0.63 | 3.15 | −59.67 | 2.50 |
| 2 | 2 | −1 | 0.01 | −0.7 | −22.11 | 5.00 |
| 3 | 1 | 0 | −0.53 | 0.38 | −17.00 | 6.33 |
| 4 | 8 | −1 | −0.82 | −0.46 | −98.00 | 9.00 |
| 5 | 1 | 2 | −0.01 | 1.97 | −22.33 | −0.50 |
| 6 | 6 | 0 | −0.4 | 1.14 | −71.11 | 19.00 |
| 7 | 3 | −1 | 0.45 | −1.01 | −28.33 | −0.17 |
| 8 | 2 | 5 | 0.73 | 4.16 | −14.11 | −14.00 |
| 9 | 0 | 3 | 0.58 | 3.02 | 6.44 | 0.33 |
| 10 | 1 | 3 | −0.1 | 3.35 | −12.22 | 5.83 |
| 11 | 9 | −1 | −0.79 | −0.19 | −108.78 | 13.50 |
| 12 | 1 | −1 | 0.05 | −0.85 | −10.56 | 2.50 |
| 13 | 1 | 6 | 0.84 | 5.1 | −1.78 | −15.00 |
| 14 | 0 | 1 | −0.13 | 1.16 | −1.44 | 2.67 |
| 15 | 4 | −1 | 1.5 | −0.74 | .27-78 | 4.33 |

As long as a certain patch of image data (meaning a representative image region 506, 508, or 510) contains a stable portion of the background or other portion of a scene, the patch may be as small as necessary to obtain either vertically-oriented or horizontally-oriented edge pixels. In many cases, a priori knowledge of a scene and dynamics of the scene may lead to selection of such regions.

In some embodiments, one or more candidate patches may be chosen as the patch. Corrections may be implemented based on the measured spatial error data of the one or more candidate patches, and the corrections may be compared to a previously-defined correction performance threshold. If the corrections do not reach the correction performance threshold, other small patches may be used until correction performance meets the correction performance threshold. When techniques described below are implemented on the data from Table 2, the vertical motion jitter is substantially reduced but the horizontal error remains virtually unchanged.

FIGS. 8A through 8C illustrate example measured frame-based spatial errors 800 using this technique. As shown in FIGS. 8A through 8C, a checkerboard pattern is used, and an intentional (X, Y) spatial noise or spatial error 800 is added to the checkerboard pattern. When the "center of signal" technique is used to automatically measure the frame-based spatial jitter in the X and Y directions, the measured values can be determined to almost perfectly factor to half of the introduced spatial errors. The difference between the measured values and the introduced spatial error is an assumed consequence of the computation of the ($X_c$, $Y_c$) "center of signal" values, which may be related to the two-pixel line width produced by the zero-crossing image processing step. The differences between the measure values and the introduced spatial errors, combined with bilinear interpolation (described below) performed to improve the spatial registration of the result, can expect such a calibration. In fact, a spatial scaling factor of 2.069 may produce the measured X, Y spatial errors, which nearly perfectly matches the known introduced data. This relation is illustrated below in Table 3.

TABLE 3

Data table for center of signal determination using a scale factor calibration

| Frame | X error image | Y error image | Measured $X_c$ | Measured $Y_c$ | Xresid error (%) | Yresid error (%) |
|---|---|---|---|---|---|---|
| 0 | 0 | 0 | 0.000 | 0.000 | 0.00 | 0.00 |
| 1 | 6 | 3 | 6.000 | 3.000 | 0.00 | 0.00 |
| 2 | 2 | −1 | 2.000 | −1.000 | 0.00 | 0.00 |
| 3 | 1 | 0 | 1.000 | 0.000 | 0.00 | 0.00 |
| 4 | 8 | −1 | 8.000 | −1.000 | 0.00 | 0.00 |
| 5 | 1 | 2 | 1.000 | 2.000 | 0.00 | 0.00 |
| 6 | 6 | 0 | 6.000 | 0.000 | 0.00 | 0.00 |
| 7 | 3 | −1 | 3.000 | −1.000 | 0.00 | 0.00 |
| 8 | 2 | 5 | 2.000 | 5.000 | 0.00 | 0.00 |
| 9 | 0 | 3 | 0.000 | 3.000 | 0.00 | 0.00 |
| 10 | 1 | 3 | 1.000 | 3.000 | 0.00 | 0.00 |
| 11 | 9 | −1 | 9.000 | −1.000 | 0.00 | 0.00 |
| 12 | 1 | −1 | 1.000 | −1.000 | 0.00 | 0.00 |
| 13 | 1 | 6 | 1.000 | 6.000 | 0.00 | 0.00 |
| 14 | 0 | 1 | 0.000 | 1.000 | 0.00 | 0.00 |
| 15 | 4 | −1 | 4.000 | −1.000 | 0.00 | 0.00 |

Several edge filter algorithms can be used with image stabilization as long as they can be implemented in the analog domain. For example, an edge filter algorithm and a patch filter algorithm are described below. Both algorithms demonstrate robust image stabilization performance even at high jitters. While the edge filter algorithm works well under all scene intensity conditions, it may introduce additional noise at low jitter, so its thresholds can be adjusted depending on the region selected for stabilization. The patch filter algorithm may achieve even better stabilization performance with sub-pixel error.

Example code for the edge filter algorithm can expressed as follows: import numpy as np
def filter_edge(frame_dg, threshold, num_colors):

```
#Define colors
max_color = num_colors−1
edge_color = max_color
non_edge_color = 0
#Get frame dimensions
num_rows = frame_dg.shape[0]
num_cols = frame_dg.shape[1]
frame_edge = np.full_like(frame_dg, non_edge_color)
#Mark edges (both rising and falling)
for i in range(1, num_rows−1):
    for j in range(1, num_cols−1):
        #w-e checking based on David Man's method in "Vision"
        if (frame_dg[i,j+1]>threshold and frame_dg[i,j−1]<(−threshold)):
            frame_edge[i,j] = edge_color
        elif (frame_dg[i,j+1]<(−threshold) and frame_dg[i,j−1]>threshold):
            frame_edge[i,j] = edge_color
        #n-s checking
        elif (frame_dg[i+1,j]>threshold and frame_dg[i−1,j]<(−threshold)):
            frame_edge[i,j] = edge_color
        elif (frame_dg[i+1,j]>(−threshold) and frame_dg[i−1,j]>threshold):
            frame_edge[i,j] = edge_color
        #nw-se checking
        elif (frame_dg[i−1,j−1]>threshold and frame_dg[i+1,j+1]<
        (−threshold)):
            frame_edge[i,j] = edge_color
        elif (frame_dg[i−1,j−1]>threshold) and frame_dg[i+1,j+1]>
        threshold):
            frame_edge[i,j] = edge_color
        #ne-sw checking
        elif (frame_dg[i−1,j+1]>threshold and frame_dg[i+1,j−1]<
        (−threshold)):
            frame_edge[i,j] = edge_color
        elif (frame_dg[i−1,j+1]<(−threshold) and frame_dg[i+1,j−1]>
        threshold):
            frame_edge[i,j] = edge_color
        #else:
```

```
# frame_edge[i,j] = non_edge_color
return frame_edge
```

Example code for the patch filter algorithm can be expressed as follows:

```
import numpy as np
def filter_uniform_patch(frame_dg, threshold, num_colors):
    #Define colors
    max_color = num_colors-1
    patch_color = max_color
    non_patch_color = 0
    #Get frame_ dimensions
    num_rows = frame_dg.shape[0]
    num_cols = frame_dg.shape[1]
    frame_uniform = np.full_like(frame_dg, non_patch_color)
    #Mark patches
    for i in range(1, num_rows-1):
        for j in range(1, num_cols-1):
            if (abs(frame_dg[i,j])<threshold)
                frame_uniform[i,j] = patch_color
    return frame_uniform
```

FIGS. 9A through 9C illustrate an example patch filter 900. As shown in FIGS. 9A through 9C, the sub-pixel stabilization performance of the patch filter is demonstrated in another natural scene example. Here, a small region of the scene that contains groups of pixels with uniform intensity is selected to perform the image stabilization. This is because the center of signal calculation provides a more accurate estimation of the jitter when grouped pixels (patches) are used instead of edges. Of course, a drawback of the patch filter algorithm is that it has reduced effectiveness when non-uniform intensity regions are absent from the scene.

FIG. 10 illustrates an example readout integrated circuit 1000 containing image stabilization capabilities based on the above-described functionality. As shown in FIG. 10, on-chip bilinear interpolation is used to improve spatial accuracy and correct for spatial jitter. Because $(X_c, Y_c)$ motion errors are determined to subpixel accuracy, it is possible to (i) internally expand the size of the image region for the entire image by multiple times (such as four times) in multiple dimensions (such as the X and Y dimensions) using switched capacitors; (ii) use known $(X_c, Y_c)$ measured motion errors to obtain a majority of the image displaced by the factor of internal expansion (such as four times) in the expanded representation of the image; and (iii) aggregate the resulting larger image to restore the original image size.

In FIG. 10, a two-dimensional bilinear interpolation of charges array 1002 is coupled to a two-by-two group of input pixel capacitors 1004. The array 1002 can be formed using any number of rows and columns of switches 1006 and interpolation capacitors 1008. In some cases, the readout integrated circuit 1000 can be formed using an equal number of rows and columns of interpolation capacitors 1008. Here, each switch 1006 is positioned between two adjacent capacitors 1008 in the rows of the array 1002. Also, connections 1010 between adjacent rows are located between adjacent capacitors 1008 in those rows. Each row of capacitors 1008 in the array 1002 further includes connections at both ends of the row with one or more adjacent rows of capacitors 1008, and additional switches 1012 can be used to couple the adjacent rows together. In addition, the input pixel capacitors 1004 are connected by switches 1014 to the first and last rows.

The array 1002 is used to compute a two-dimensional bilinear interpolation of charges nearly instantly by the natural sharing of charges from the input pixel capacitors 1004 into charge-interpolation pixel capacitive wells (the capacitors 1008) when the various switches 1006, 1012, 1014 are closed. After charge sharing occurs, the switches 1006, 1012, 1014 are opened, resulting in an image that is four times larger in both dimensions. The charges on the capacitors 1008 in the array 1002 can be individually detected, and the values of the charges on the capacitors 1008 can be used to generate a difference of Gaussians image 300, 302, 304. This can be repeated any number of times to generate any desired number of difference of Gaussians images.

Note that there is no new spatial information contained in these interpolation capacitors 1008. However, the transformation of the pixel capacitor charges into a larger size makes the subtraction of image motion error by shifting the expanded image spatially possible with respect to the input image. The fractional part of the $(X_c, Y_c)$ error is used so that, when truncated by a following aggregation step, the resulting spatial motion error correction accuracy is better than one pixel in spatial extent. Compensation for signal attenuation effects resulting from charge sharing operations (such as global gain compensation) can be incorporated using post-processing, such as with conventional nonuniformity correction (NUC) techniques. In some embodiments, the bilinear interpolation and following spatial aggregation steps can be skipped at an expense of subpixel accuracy. Output scanning and analog-to-digital (ADC) digitization approaches can be used to multiplex the resulting image off-chip.

In some embodiments, only small regions within an image need to be extracted in a motion-stable state, and the measured $(X_c, Y_c)$ errors combined with windowed readout integrated chip output architectures can be used to grab the motion jitter-contaminated data, resulting in motion-stable image data. In this case, the windowing architecture may directly use the measured $(X_c, Y_c)$ spatial error data.

Note that FIG. 10 illustrates a single array 1002 positioned between a single two-by-two group of input pixel capacitors 1004. This is for simplicity of illustration and explanation only. In a conventional device, there will be far more than four input pixel capacitors 1004, and multiple two-dimensional bilinear interpolation of charges arrays 1002 may be used with multiple groups of input pixel capacitors 1004.

Although FIGS. 2A through 10 illustrate one example of a readout integrated circuit 1000 with stabilization capacity and related details, various changes may be made to FIGS. 2A through 10. For example, the sizes, shapes, and dimensions of the readout integrated circuit 1000 and its individual components can vary as needed or desired. Also, the number and placement of various components in the readout integrated circuit 1000 can vary as needed or desired. Further, the readout integrated circuit 1000 may be used in any other suitable image stabilization process and is not limited to the specific processes described above. In addition, the specific details shown in FIGS. 2A through 9C are meant to explain various functions that can be performed using the readout integrated circuit 1000, but the details shown in FIGS. 2A through 9C are examples since image data and scenes can vary widely.

Figure 11:
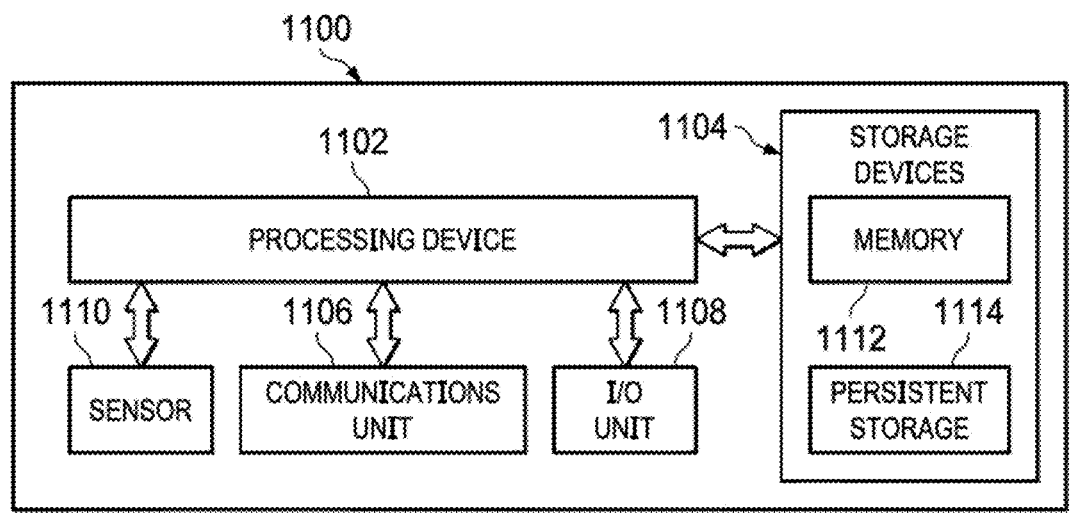
FIG. 11 illustrates an example device for use with a readout integrated circuit containing image stabilization capabilities in accordance with this disclosure.

FIG. 11 illustrates an example device 1100 for use with a readout integrated circuit 1000 containing image stabilization capabilities in accordance with this disclosure. One or more instances of the device 1100 (or portions thereof) may, for example, at least partially use the functionality of the readout integrated circuit 1000 of FIG. 10. However, the readout integrated circuit 1000 may be used in any other suitable manner.

As shown in FIG. 11, the device 1100 denotes a processing system that includes at least one processing device 1102, at least one storage device 1104, at least one communications unit 1106, at least one input/output (I/O) unit 1108, and at least one sensor 1110. The processing device 1102 may execute instructions that can be loaded into a memory 1112. The processing device 1102 includes any suitable number(s) and type(s) of processors or other devices in any suitable arrangement. Example types of processing devices 1102 include one or more microprocessors, microcontrollers, DSPs, ASICs, GPUs, FPGAs, or discrete circuitry.

The memory 1112 and a persistent storage 1114 are examples of storage devices 1104, which represent any structure(s) capable of storing and facilitating retrieval of information (such as data, program code, and/or other suitable information on a temporary or permanent basis). The memory 1112 may represent a random access memory or any other suitable volatile or non-volatile storage device(s). The persistent storage 1114 may contain one or more components or devices supporting longer-term storage of data, such as a read only memory, hard drive, Flash memory, or optical disc.

The communications unit 1106 supports communications with other systems or devices. For example, the communications unit 1106 can include a network interface card or a wireless transceiver facilitating communications over a wired or wireless network. The communications unit 1106 may support communications through any suitable physical or wireless communication link(s). The I/O unit 1108 allows for input and output of data. For example, the I/O unit 1108 may provide a connection for user input through buttons, a touchscreen, or other suitable input device. The I/O unit 1108 may also send output to a display or other suitable output device.

The sensor 1110 includes one or more cameras or other imaging sensors, which may be used to capture images of scenes. The sensor 1110 may also include one or more instances of the readout integrated circuit 1000, which can be used to process captured images and produce difference of Gaussians images (such as the images 300, 302, 304). Note, however, that the readout integrated circuit(s) 1000 may be positioned outside the sensor 1110 and used in conjunction with the sensor 1110. In some embodiments, the instructions executed by the processing device 1102 can include instructions used to process the difference of Gaussians images. For example, the instructions when executed may cause the processing device 1102 to obtain difference of Gaussians images corresponding to multiple input images, determine motion error in the input images by comparing the difference of Gaussians images, and adjust at least some of the input images based on the determined motion error.

Although FIG. 11 illustrates one example of a device 1100 for use with a readout integrated circuit 1000 containing image stabilization capabilities, various changes may be made to FIG. 11. For example, computing and imaging devices and systems come in a wide variety of configurations, and FIG. 11 does not limit this disclosure to any particular computing or imaging device or system.

Figure 12:
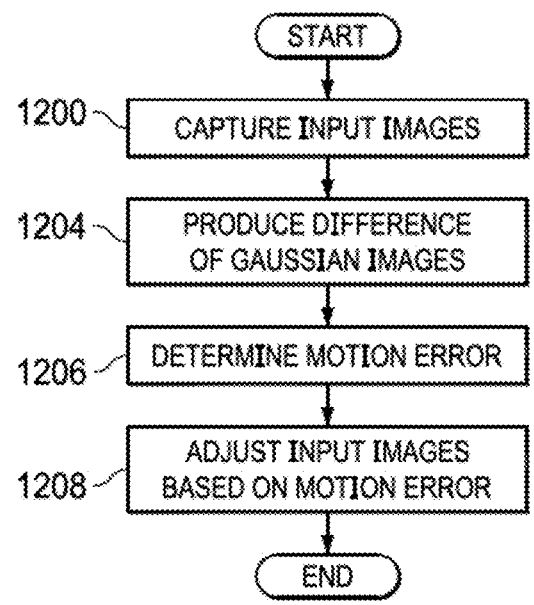
FIG. 12 illustrates an example method for using a readout integrated circuit containing image stabilization capabilities according to this disclosure.

FIG. 12 illustrates an example method 1200 for using a readout integrated circuit containing image stabilization capabilities according to this disclosure. For ease of explanation, the method 1200 of FIG. 12 is described as being performed using the readout integrated circuit of FIG. 10 in the electronic device 1100 of FIG. 11. However, the method 1200 may be used with any other suitable device or system, and the readout integrated circuit 1000 may be used in any other suitable manner.

As shown in FIG. 12, multiple input images are captured using an optical sensor at step 1202. This may include, for example, the electronic device 1100 capturing the input images 306, 308, 310 using the sensor 1110. The input images can be captured in rapid succession in order to capture the images of a scene. The input images can be captured using any suitable technique, such as mid-wave infrared imaging or other infrared imaging or non-infrared imaging technique. The input images can be susceptible to image motion jitter. Depending on the implementation, a first image captured can be used as a reference image, or another captured image may be used as the reference image.

A difference of Gaussians image is produced for each of the input images using an analog circuit at step 1204. This may include, for example, the electronic device 1100 using the readout integrated circuit 1000 to generate a difference of Gaussians image 300, 302, 304 for each of the input images 306, 308, 310. As a particular example, after each input image 306, 308, 310 is captured, the input pixel capacitors 1004 are charged, and the switches 1010, 1012, 1014 can be closed in order to pass the charges to the interpolation capacitors 1008. The charges stored on the interpolation capacitors 1008 in the array 1002 can be identified and used to produce a difference of Gaussians image 300, 302, 304 corresponding to input image 306, 308, 310. Depending on the implementation, a first difference of Gaussians image that is generated can be used as a reference difference of Gaussians image, or another generated difference of Gaussians image may be used as the reference difference of Gaussians image.

Motion error in the input images is determined based on comparing the difference of Gaussians images at step 1206. This may include, for example, the processing device 1102 of the electronic device 1100 receiving the difference of Gaussians images 300, 302, 304 and generating the zero-crossing images 500, 502, 504 (or inverse zero-crossing images). Here, a pixel in each zero-crossing image 500, 502, 504 can be determined to be a zero-crossing pixel if its neighboring pixels have opposite values in the associated difference of Gaussians images 300, 302, 304. In some cases, the zero-crossing pixels can be changed or set to have one value, and non-zero-crossing pixels can be changed or set to have another value. This may also include the processing device 1102 of the electronic device 1100 calculating centers of signals based on the zero-crossing images 500, 502, 504. Each center of signal may represent a weighted average of the zero-crossing pixels in a portion (patch) of the zero-crossing images 500, 502, 504. This may further include the processing device 1102 of the electronic device 1100 comparing the centers of signals, such as by comparing the centers of signals associated with non-reference input images to the center of signal associated with the reference input image. Any differences in the centers of signals may represent the determined motion error.

At least some of the input images are adjusted based on the determined motion error at step 1208. This may include, for example, the processing device 1102 of the electronic device 1100 adjusting each non-reference input image based on the determined motion error of that non-reference input image relative to the reference input image. Ideally, at the end of this process, each of the non-reference input images may have little or no motion error relative to the reference input image.

Although FIG. 12 illustrates one example of a method 1200 for using a readout integrated circuit 1000 containing image stabilization capabilities, various changes may be made to FIG. 12. For example, while shown as a series of steps, various steps in FIG. 12 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An apparatus comprising:
  an optical sensor configured to capture a plurality of input images;
  an analog circuit configured to produce a difference of Gaussians image for each of the input images; and
  at least one processor configured to (i) determine motion error in the input images based on comparing the difference of Gaussians images and (ii) adjust at least some of the input images based on the determined motion error.

2. The apparatus of claim 1, wherein the analog circuit comprises a charge-interpolation pixel capacitor array between a two-by-two group of input pixel capacitors.

3. The apparatus of claim 2, wherein:
  the analog circuit further comprises a plurality of switches; and
  each of the switches is positioned between two adjacent capacitors of the charge-interpolation pixel capacitor array.

4. The apparatus of claim 3, wherein:
  the charge-interpolation pixel capacitor array is configured to provide an interpolation of a two-dimensional area between the two-by-two group of input pixel capacitors; and
  to provide the interpolation, the analog circuit is configured to:
    close the switches to allow sharing of charges from the two-by-two group of input pixel capacitors to the capacitors of the charge-interpolation pixel capacitor array; and
    open the switches to provide image data based on a two-dimensional size of the charge-interpolation pixel capacitor array.

5. The apparatus of claim 1, wherein:
  the at least one processor is further configured to produce zero-crossing images each including pixels associated with pixels of a corresponding one of the difference of Gaussians images having opposing neighbor pixels; and
  the opposing neighbor pixels have opposite values in the corresponding difference of Gaussians image.

6. The apparatus of claim 5, wherein the at least one processor is further configured to determine a center of signal for each of the zero-crossing images based on an average pixel density of the pixels in the zero-crossing image.

7. The apparatus of claim 6, wherein, to adjust at least some of the input images based on the determined motion error, the at least one processor is configured to:
  determine a motion jitter based on comparing the determined centers of signals corresponding to different ones of the input images; and
  adjust at least one of the input images based on the determined motion jitter.

8. The apparatus of claim 5, wherein the at least one processor is further configured to produce one or more inverted zero-crossing images.

9. The apparatus of claim 8, wherein the at least one processor is further configured to determine a center of signal for each of the one or more inverted zero-crossing images based on an average pixel density in the inverted zero-crossing image.

10. The apparatus of claim 9, wherein, to adjust at least some of the input images based on the determined motion error, the at least one processor is configured to:
  determine a motion jitter based on comparing the determined center of signals corresponding to different ones of the input images; and
  adjust at least one of the input images based on the determined motion jitter.

11. A method comprising:
  capturing, using an optical sensor, a plurality of input images;

producing, using an analog circuit, a difference of Gaussians image for each of the input images;
determining, using at least one processor, motion error in the input images based on comparing the difference of Gaussians images; and
adjusting, using the at least one processor, at least some of the input images based on the determined motion error.

12. The method of claim 11, wherein the analog circuit comprises a charge-interpolation pixel capacitor array between a two-by-two group of input pixel capacitors.

13. The method of claim 12, wherein:
the analog circuit further comprises a plurality of switches; and
each of the switches is positioned between two adjacent capacitors of the charge-interpolation pixel capacitor array.

14. The method of claim 13, further comprising:
providing, using the charge-interpolation pixel capacitor array, an interpolation of a two-dimensional area between the two-by-two group of input pixel capacitors;
wherein providing the interpolation comprises:
closing the switches to allow sharing of charges from the two-by-two group of input pixel capacitors to the capacitors of the charge-interpolation pixel capacitor array; and
opening the switches to provide image data based on a two-dimensional size of the charge-interpolation pixel capacitor array.

15. The method of claim 11, further comprising:
producing zero-crossing images each including pixels associated with pixels of a corresponding one of the difference of Gaussians images having opposing neighbor pixels, the opposing neighbor pixels having opposite values in the corresponding difference of Gaussians image.

16. The method of claim 15, further comprising:
determining a center of signal for each of the zero-crossing images based on an average pixel density of the pixels in the zero-crossing image.

17. The method of claim 16, wherein adjusting at least some of the input images based on the determined motion error comprises:
determining a motion jitter based on comparing the determined centers of signals corresponding to different ones of the input images; and
adjusting at least one of the input images based on the determined motion jitter.

18. A non-transitory computer readable medium containing instructions that when executed cause a signal processor to:
obtain, using an optical sensor and an analog circuit, a difference of Gaussians image for each of a plurality of input images;
determine motion error in the input images based on comparing the difference of Gaussians images; and
adjust at least some of the input images based on the determined motion error.

19. The non-transitory computer readable medium of claim 18, further containing instructions that when executed cause the signal processor to:
close switches each positioned between two adjacent capacitors of a charge-interpolation pixel capacitor array in the analog circuit to allow sharing of charges from a two-by-two group of input pixel capacitors to the capacitors of the charge-interpolation pixel capacitor array; and
open the switches to provide image data based on a two-dimensional size of the charge-interpolation pixel capacitor array.

20. The non-transitory computer readable medium of claim 18, further containing instructions that when executed cause the signal processor to:
produce zero-crossing images each including pixels associated with pixels of a corresponding one of the difference of Gaussians images having opposing neighbor pixels, the opposing neighbor pixels having opposite values in the corresponding difference of Gaussians image.

* * * * *